Jan. 17, 1961    F. P. BALDWIN ET AL    2,968,588
ADHESION OF RUBBERY POLYMERS TO TIRE CORDS
Filed Dec. 19, 1955
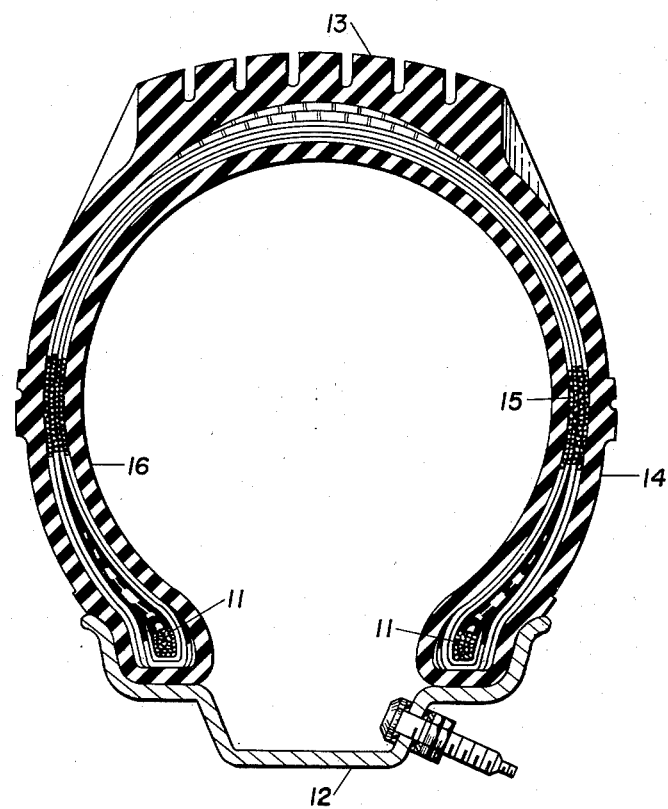
Samuel B. Robison
Francis P. Baldwin    Inventors
By W. H. Smyers    Attorney

United States Patent Office 2,968,588
Patented Jan. 17, 1961

2,968,588
ADHESION OF RUBBERY POLYMERS TO TIRE CORDS

Francis P. Baldwin, Colonia, and Samuel B. Robison, Roselle, N.J., assignors to Esso Research and Engineering Company, a corporation of Delaware Filed Dec. 19, 1955, Ser. No. 553,830

14 Claims. (Cl. 154—139)

This invention relates to coating compositions for natural or synthetic fibrous materials, such as cotton, rayon, nylon, etc., to improve the adhesion thereof to rubber such as natural rubber or especially synthetic rubber such as GR-S rubber, Buna-N rubber, and preferably butyl rubber.

More particularly, the present invention relates to coating compositions containing brominated butyl rubber. The invention also involves processes for producing the aforesaid compositions and to methods of employing the same to obtain improved adhesion between a rubber and fibrous filaments, cords, threads, fabrics, etc. particularly in the presence of phenolic-aldehyde resins. The present invention also appertains to the resulting rubber-fibrous composites produced by the aforesaid processes.

Heretofore, cellulosic and synthetic fibers such as rayon, regenerated cellulose and nylon threads, cords, or filaments have adhered very poorly to rubber and to compounded rubber stocks (especially containing butyl rubber) when they were united and the rubber stock subsequently cured according to any known process of producing adhesion between rubber and fibers. This poor adhesion, especially of synthetic threads, cords, and fabrics to synthetic rubber such as butyl rubber has constituted a very serious obstacle to more extensive use of butyl rubber in the manufacture of automobile tires, reinforced rubber belts and similar products consisting of alternate plies of rubber and cords. Such products are required to adhere very strongly for long periods of time under drastic conditions of high temperature, constant flexing, bending, shock, etc. For example, if nylon cord is pressed into butyl rubber or a butyl rubber stock and the composite vulcanized, it will be observed that the nylon cord may be pulled away from the rubber with comparative facility.

Butyl rubber comprises a copolymer containing about 85–99.5%, preferably 95–99.5% of a $C_4$–$C_8$ iso-olefin such as isobutylene, the remainder being a $C_4$–$C_{10}$ multi-olefin, preferably a $C_4$ to $C_6$ conjugated diolefin such as butadiene, dimethyl butadiene, piperylene or especially isoprene. The preparation of butyl-type rubbers is described in U.S. Patent 2,356,128 to Thomas et al. and also in other patents as well as in literature.

According to the present invention, fibrous materials such as tire cords are coated with a phenolic-aldehyde type resin and a brominated butyl rubber which contains at least 0.5, preferably at least 2.0 weight percent combined bromine but not more than about 0.5 N to 3 N, preferably 1.0 N to 1.5 N weight percent combined bromine wherein $$N = \frac{79.92L}{(100-L)M_1 + L(M_2 + 79.92)} \times 100$$

and:

L = mole percent of the multi-olefin in the polymer.
$M_1$ = molecular weight of the isoolefin.
$M_2$ = molecular weight of the multi-olefin.
79.92 = atomic weight of bromine.

The invention will be more apparent with reference to the drawing in which the single figure is a cross-sectional view of a pneumatic tubeless tire depicted as being mounted on a conventional tubeless type of tire wheel rim.

In one embodiment of the present invention, fibrous materials such as tire cords are first passed through an aqueous solution of a phenolic-aldehyde type resin such as a resorcinol-formaldehyde resin, having a mole ratio of the phenolic compound to the aldehyde of about 1–1 to about 1–5, and dried. The concentration of the resin in the solvent is preferably between about 0.5% to 10.0%.

The resulting resin-coated cord is then dipped into a solution of brominated butyl rubber or preferably calendered at between about 125° F. to 300° F. with a brominated butyl rubber formulation in which 100 parts by weight of the brominated butyl rubber have been compounded in a composition comprising:

| Component | Parts by Weight | | |
|---|---|---|---|
| | Range | Preferred | Most Preferred |
| Mold release agent (e.g. stearic acid) | 0–10 | 0.1–5 | 0.3–2.0 |
| Pigment (e.g. carbon black) | 0–150 | 10–100 | 20–60 |
| Basic Metal Compound (e.g. zinc oxide) | 0–50 | 1–30 | 5–20 |
| Anti-Oxidant (e.g. phenyl beta naphthylamine) | 0–5 | 0.1–2.0 | 0.2–0.6 |

The brominated butyl rubber cement preferably contains about 5 to 50 grams of the above composition plus brominated butyl rubber dissolved in about 50–200 cc. of a rubber solvent such as kerosene, naphtha, straight run material spirits, gasoline, hexane, heptane, benzene, toluene, ethyl chloride, chloroform, carbon tetrachloride, etc.

The cords, treated as above-described, are then dried at temperature above about 150° F., preferably above 200° F., e.g. 225° F. The cords may then be embedded in an unvulcanized rubber such as butyl rubber, natural rubber, chlorinated butyl rubber, GR-S rubber (a rubbery butadiene-styrene copolymer), Buna-N rubber (a rubbery butadiene-acrylonitrile copolymer), chloroprene rubber, etc., and sulfur vulcanized at 250° to 400° F., preferably 300° to 375° F. for about one minute up to several hours or more to produce a finished article having an improved bond between the coated cords and rubber.

The above procedure produces superior articles suitable for use in constructing tire carcasses for automobiles, trucks, airplanes, etc. as well as numerous other uses such as conveyor belts and other products built up of a plurality of laminations of cord and butyl rubber, etc., the invention being especially applicable to such products which have at least one layer which is of butyl rubber. The invention may also be applied in uses involving merely a single layer of a fabric such as nylon, cotton, rayon, silk, etc., which may be either coated on one side or both sides, with the resin and brominated butyl rubber as described above.

The cure of the finished articles may be not only in the presence of sulfur or sulfur-containing vulcanization agents, but also by p-dinitrosobenzene, p-quinone dioxime, p-quinone dioxime dibenzoate, tellurium diethyl dithiocarbomate, polyalkyl thiuram sulfides such as tetramethyl thiuram disulfide, etc. The cure is also preferably in the presence of basic metal compounds such as bivalent metal oxides, e.g. zinc oxide.

The phenolic-aldehyde resins which are within the purview of the present invention may be generally defined as belonging to the class of heat-hardening phenol-aldehyde type resins, preferably resins from phenolic compounds which, prior to heat-hardening or thermosetting are water soluble at least to the extent of 5–10% or more. Such resins are capable of thermally setting in the absence of any added catalysts at temperatures of about 150°–400° F., temperatures of 200°–250° F. being preferred for coating rayon whereas higher temperatures are permissible for nylon.

As phenolic compounds capable of producing resins of the abovementioned characteristics, mono or especially dihydroxy benzenes are satisfactory. Di-hydroxy benzenes having the hydroxyl groups meta with respect to each other are preferred. Satisfactory phenolic compounds include phenol, cresols, phloroglucinol, xylenols, trimethyl phenols, mono or dichloro phenols, diamyl or diisopropyl phenols, p-tertiary butyl phenol, p-phenylphenol, hydroquinone, and especially resorcinol.

The preferred aldehydes for reaction with the above phenolic compounds include formaldehyde or a material supplying formaldehyde such as paraformaldehyde. Other suitable aldehydes include acetaldehyde, propionaldehyde, furfural, etc. The ratio of the phenolic compound to the aldehyde is preferably such that the resin, prior to thermosetting, has substantial water solubility as well as solubility in polar solvents. In order to produce the desired resin, a small amount of an alkali metal containing catalyst or other condensing agent is preferred. If sodium hydroxide is employed, it is advantageously present in amounts of about 0.02 to 0.5 percent by weight, based on reactants.

The brominated butyl rubber is produced by reacting the unvulcanized rubber with bromine or bromine-containing compounds so that the polymer contains at least 0.5 weight percent of combined bromine but not more than about 3 atoms of bromine combined in the polymer per molecule of multi-olefin present therein; i.e. not more than about 3 atoms of combined bromine per double bond in the polymer.

Suitable brominating agents which may be employed are molecular bromine, alkali metal bromites (preferably sodium hypobromite), sulfur bromides (particularly oxygenated sulfur bromines), pyridinium bromide perbromide, N-bromo-succinimide, alpha-bromoaceto acetanilide, tri-bromophenol bromide, N-bromoacetamide, beta-bromo-methyl phthalimide, and other common brominating agents. The preferred brominating agents are molecular bromine and/or those bromine compounds which are known to lead to allylic substitution, e.g. N-bromosuccinimide, beta-bromoethyl phthalimide, N-bromoacetamide, etc. The bromination is advantageously conducted at about −30° C. to +100° C., preferably at about 20° to 80° C. for about one minute to several hours. However, the temperatures and times are regulated to brominate the rubbery copolymer to the extent abovementioned.

The bromination may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, naphthalene, chlorobenzene, chloroform, trichloroethane, carbon tetrachloride, etc., and adding thereto the bromine or other brominating agent, preferably in solution, such as dissolved in an alkyl chloride, carbon tetrachloride, etc. Another variation comprises employing liquid bromine. Still a further method resides in blending with the solid copolymer a solid brominating agent which is known to lead to allylic substitution such as N-bromosuccinimide, supra. In such a case, the blend formed is preferably mill-mixed and heated to a temperature sufficient to brominate the solid copolymer. The use of elevated or depressed pressures is optional since atmospheric pressure is satisfactory. However the pressure may vary, depending upon the foregoing temperatures and reacting times from about 1 to 400 p.s.i.a.

The invention will be better understood from the following experimental data and examples.

Brominated butyl rubber—"A": Sixty grams of butyl rubber (GR–I–15) were dissolved in 960 grams of carbon tetrachloride. Two milliliters of liquid bromine were then added and reaction was allowed to ensue for one hour at room temperature. The brominated rubbery polymer formed was then precipitated by the addition of excess isopropyl alcohol. In place of isopropyl alcohol, other known non-solvents for butyl rubber may be employed such as $C_1$–$C_4$ alkanols, ketones such as acetone, etc. The rubbery polymer was then redissolved in hexane and reprecipitated with isopropyl alcohol. The brominated rubbery product was then dried at 65° C. under a vacuum of 0.1–2.0 inches of mercury absolute. The brominated product compared to the original polymer as follows:

| Original Polymer | Brominated Product |
| --- | --- |
| Iodine No.—11.6 (cg./g.) | Iodine No. (cg./g.)—4.87, 2.93 wt. percent combined bromine. |

*Example I*

Brominated butyl rubber—"A" was compounded in the following brominated butyl rubber cement containing 90 cc. of n-heptane and 10 grams of the following:

| Component | Parts by Weight |
| --- | --- |
| Brominated butyl rubber—"A" | 100 |
| Pigment (EPC carbon black) | 50 |
| Mold release agent (stearic acid) | 1.0 |
| Anti-Oxidant (phenyl beta naphthylamine) | 0.25 |
| Zinc Oxide | 5.0 |

Rayon and nylon tire cords were first treated with aqueous solutions of resorcinol-formaldehyde resins having mole ratios of formaldehyde to resorcinol of 1/1 to 5/1 as tabulated below. The reaction between the resorcinol and the formaldehyde was at 25° C. for 48 hours. The resin concentration was 5 parts by weight of resin per 100 parts by weight of water. The cords were placed beneath the surface of the resin solution which had been aged for 48 hours and maintained in a beaker by a wire guide. The time of aging may be almost negligible up to about one month or more at room temperature up to about 200° F. The cord was then dried in a circulating air oven at 250° F. for 5 minutes.

The above brominated butyl rubber cement was then applied by forcing the resin-coated cords beneath the surface of the cement by a wire guide and then passed through an air blast to remove excess cement. The cord was then redried for 5 minutes at 250° F.

The cords were then lodged in an uncured butyl rubber matrix and vulcanized for 25 minutes at 320° F.; the matrix having the following composition:

| Ingredient | Parts by Weight |
| --- | --- |
| GR–I–17 | 100 |
| M.P.C. carbon black | 50 |
| Stearic Acid | 0.5 |
| p-dinitrosobenzene | 0.5 |
| Zinc oxide | 5.0 |
| Sulfur | 2.0 |
| Tellurium diethyl dithiocarbamate | 1.0 |
| Plasticizer hydrocarbon oil[1]—"A" | 15.0 |

[1] The plasticizer hydrocarbon oil was a paraffinic base oil having the following characteristics:

S.S.U. at 100° F _____ 110
Pour Point, ° F _____ 30
Flash Point, ° F _____ 365

The adhesions of the cords, coated in accordance with the invention, to the matrix were measured by a technique essentially similar to the "H" test described by Lyons, Conrad and Nelson, Rubber Chemistry and Technology, 268, vol. XX (1947). The tire cords used were rayon tire cord of 1650/2 denier ply construction and nylon cord of 840 denier 2 ply construction. The test specimens were prepared with a ½ inch length of treated cord vulcanized into the center of a 1½ x ½ x ¼ inch butyl rubber matrix composition. The vulcanized rubber matrix was reinforced with light cotton duck on the two long sides from which the cord did not protrude. The force required to pull the ½ inch length of cord from the rubber block was measured by means of a Scott tensile tester at a 20 inches per minute jaw separation rate. The results were as follows:

| Cord | Rayon | | | | Nylon |
|---|---|---|---|---|---|
| Cord # | 1 | 2 | 3 | 4 | 5 |
| Mole ratio (formaldehyde/resorcinol) | 1/1 | 3/1 | 4/1 | 5/1 | 3/1 |
| Resorcinol, g | 6 | 6 | 6 | 5 | 6 |
| 37% formaldehyde (cc.) | 4.06 | 12.2 | 13.6 | 16.9 | 12.2 |
| NaOH, 1%, cc | 12 | 12 | 10 | 10 | 12 |
| Water, cc | 130 | 187 | 179 | 205 | 187 |
| "H" Test Adhesion Results (Adhesion in pounds at room temperature) | 20.3 | 16.3 | 17.6 | 19.9 | 13.4 |

The above data indicates that superior adhesion is obtained in all instances when employing the brominated butyl rubber cements in conjunction with resorcinol-formaldehyde resins. Maximum values of about 5–7 pounds for nylon and 13–15 pounds for rayon were obtainable heretofore using unmodified butyl rubber cements in conjunction with resorcinol-formaldehyde resins.

One particular advantageous use for the brominated butyl rubber-phenolic aldehyde resin combinations of the present invention is in pneumatic tires of either the inner tube containing variety or in a tubeless type tire. Referring now to the drawing, the single figure depicts a pneumatic tubeless tire which comprises a hollow toroidal type member which is substantially U-shaped in cross-section by virtue of an open portion which extends around the inner periphery of the member. In other words, the tire is of a tubular type structure which has a cross section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent the said tread area 13 of the tire. The remaining construction of the tire may vary according to conventional fabrication, but in general the tire is a multi-layered type of structure with an outer layer as abovementioned. The layer next adjacent the outer layer generally comprises a carcass 15 which includes a rubber having incorporated therein a fabric composed of a plurality of cotton, rayon, or nylon cords.

According to one embodiment of the present invention, said automobile tire cords are coated first with an aqueous solution of a resinous phenolic-aldehyde condensation product, preferably resorcinol-formaldehyde, and then coated with a cement comprising a solution of brominated butyl rubber in a volatile solvent. The butyl rubber contains at least 0.5 wt. percent combined bromine but not more than about 3 combined atoms of chlorine per double bond in the polymer. The cement also may contain a rubber pigment (filler) such as carbon black, clays, silica, etc.; bivalent metal oxides (or hydroxides) such as ZnO, CaO, MgO, plasticizer oils, ultra accelerators and/or antioxidants etc. The resulting coated cord when dried has been found to have much greater adhesion after vulcanization at 250–400° F. to butyl rubber and other rubbers in the carcass layers of tires.

The tire also includes an inner lining advantageously made from rubber, e.g. butyl rubber or brominated butyl rubber, which must be substantially impermeable to air. For example, the lining may advantageously comprise natural rubber, a rubbery copolymer, brominated copolymer or mixtures of any of the above wherein the copolymer comprises the reaction product of about 70 to 99.5 weight percent of a $C_4$–$C_7$ isoolefin, such as isobutylene, and about 0.5 to 30 weight percent of a $C_4$–$C_{14}$ multi-olefin, such as isoprene which has been at least partially vulcanized by heating in the presence of a vulcanization agent for several minutes to 5 hours or more at about 200° to 400° F. The above multi-layers, at least three in number, are conventionally bonded or otherwise adhered together, for example, by cementing and/or especially by vulcanization, etc., to form a tire of a unitary structure.

The brominated butyl rubber and phenolic-aldehyde compositions of the present invention may be employed in the tire carcass alone or in admixture with minor proportions of natural rubber or certain synthetic rubbers to include chloroprene rubber, polyisoprene, butadiene or isopene vinyl pyridine copolymers, and particularly copolymers of butadiene with acrylonitrile (e.g. Buna-N rubber) or copolymers of butadiene with styrene such as GR–S rubber, etc.

The intermediate or carcass layer including a rubber and a plurality of fibrous cords and/or fabric, must be of both desirable rigidity and strength. The performance of this layer is therefore dependent upon the bond or adhesion between the cords or fabric and the rubber. Certain synthetic rubbers, and especially butyl rubber does not normally have good adhesion to such fibrous materials, particularly if they are synthetic such as rayon, polyacrylonitrile and especially nylon. The present invention has solved this difficulty and provides a strong bond between butyl rubber and such fibers by employing the coating compositions and coating technique as hereinbefore described.

While there are above described a number of specific embodiments of the present invention, it is obviously possible to produce other embodiments and various equivalent modifications and variations thereof without departing from the spirit of the invention or the scope of the appended claims.

What is claimed is:

1. A process for improving the surface tack of a textile fibrous material which comprises coating said material with a phenolic-aldheyde resin and then with a second coating of an isoolefin-multiolefin butyl rubber copolymer modified to contain at least 0.5 wt. percent of a brominating agent to improve its adhesive characteristics but not more than about three atoms of bromine per double bond in the rubber.

2. Process according to claim 1 in which the phenolic-aldehyde resin is a resorcinol-formaldehyde resin.

3. Process according to claim 1 in which the brominated butyl rubber copolymer is also in admixture with per 100 parts of said rubber about:

10–100 parts by weight of carbon black and
5–20 parts by weight of zinc oxide.

4. A process which comprises coating a textile fibrous material with an aqueous solution of a phenolic-aldehyde resin, drying said material and coating the product formed with a multiolefin-isoolefin butyl rubber copolymer which has been reacted with at least 0.5 wt. percent of a brominating agent to impart improved adhesive characteristics thereto but not more than about three atoms of bromine per double bond in the rubber.

5. Process according to claim 4 in which the fibrous material is a synthetic tire cord, the resin being a resorcinol-formaldehyde condensation product.

6. Process according to claim 5 in which the tire cords are of nylon, the butyl rubber copolymer having been compounded with about 10–100 parts by weight of powdered filler per 100 parts of rubber.

7. Process according to claim 5 in which the butyl rubber copolymer is dissolved in a volatile organic solvent.

8. A textile fibrous material coated with a phenolic-aldehyde resin and then coated with a multiolefin-isoolefin butyl rubber copolymer modified to contain at least 0.5 wt. percent of bromine to improve its adhesion characteristics but not more than about 3 atoms of bromine per double bond in the rubber.

9. A textile fibrous material coated with a first layer of a resorcinol-formaldehyde resin and having an outer coating of a multiolefin-isoolefin butyl rubber copolymer modified with at least 0.5 wt. percent of bromine to improve its adhesion characteristics but not more than about three atoms of bromine per double bond in the rubber.

10. A laminated structure comprising a textile fibrous material, said fibrous material being coated with a first layer of a resorcinol-formaldehyde resin and a second layer of a multiolefin-isoolefin butyl rubber copolymer modified to contain at least about 0.5 wt. percent bromine but not more than about three combined atoms of bromine per double bond in the copolymer, and at least one layer of an unmodified isoolefin-multiolefin butyl rubber copolymer adhesively united to the coated surface of the fibrous material.

11. A rubber tire which contains in the carcass thereof a plurality of cords imbedded in a rubber, said cords having been coated with a phenolic-aldehyde resin, dried and then coated with a multiolefin-isoolefin butyl rubber copolymer which has been modified to contain at least 0.5 wt. percent of bromine to improve the adhesion of said cords to the rubber in which they are imbedded but not more than about three atoms of bromine per double bond in the rubber.

12. In a tubeless tire, the combination which comprises an inner layer of a member selected from the group consisting of natural rubber, an isoolefin-multiolefin butyl rubber copolymer and a brominated isoolefin-multiolefin butyl rubber copolymer; an outer layer including an open-bellied body comprising two opposing sidewalls, spaced bead portions and a median tread area; and an intermediate layer defining a carcass including an unmodified isoolefin-multiolefin butyl rubber copolymer and a plurality of cords imbedded therein, wherein said cords have been first coated with a phenolic-aldehyde resin and then coated with a multiolefin-isoolefin butyl rubber copolymer modified to contain at least 0.5 wt. percent of bromine to improve the adhesion of said cords to the unmodified butyl rubber but not more than about three atoms of bromine per double bond in the modified butyl rubber formed.

13. A fibrous material selected from the group of rayon and nylon, coated with a first layer of a resorcinol-formaldehyde resin and a second layer of an isobutylene-isoprene butyl rubber copolymer having an iodine number of about 11 modified to contain about 2.9 wt. percent of bromine.

14. A process which comprises coating a fibrous material selected from the group of rayon and nylon with an aqueous solution of a resorcinol-formaldehyde resin, drying said material and coating the dried product with a brominated butyl rubber cement in which the butyl rubber is an isobutylene-isoprene butyl rubber copolymer having an iodine number of about 11, modified by reaction with bromine in an inert solvent at room temperature to incorporate about 2.9 wt. percent bromine, to impart improved adhesive characteristics thereto when imbedded entirely in an unmodified isoolefin-multiolefin butyl rubber copolymer.

References Cited in the file of this patent

UNITED STATES PATENTS

| | | |
|---|---|---|
| 2,211,951 | Hershberger | Aug. 20, 1940 |
| 2,354,426 | Briant | July 25, 1944 |
| 2,631,984 | Crawford et al. | Mar. 17, 1953 |
| 2,653,886 | Gentle et al. | Sept. 29, 1953 |
| 2,698,042 | Perkins | Dec. 28, 1954 |
| 2,720,749 | Crawford et al. | Oct. 11, 1955 |
| 2,754,239 | Robison | July 10, 1956 |
| 2,822,311 | Rowe et al. | Feb. 4, 1958 |